US012585240B2

(12) United States Patent
Osada et al.

(10) Patent No.: US 12,585,240 B2
(45) Date of Patent: Mar. 24, 2026

(54) WIRING ERROR DETECTION DEVICE FOR MOTOR

(71) Applicant: FANUC CORPORATION, Yamanashi (JP)

(72) Inventors: Reo Osada, Yamanashi (JP); Keisuke Tsujikawa, Yamanashi (JP); Shougo Shinoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 331 days.

(21) Appl. No.: 18/552,359

(22) PCT Filed: Apr. 7, 2021

(86) PCT No.: PCT/JP2021/014818
§ 371 (c)(1),
(2) Date: Sep. 25, 2023

(87) PCT Pub. No.: WO2022/215210
PCT Pub. Date: Oct. 13, 2022

(65) Prior Publication Data
US 2024/0036546 A1 Feb. 1, 2024

(51) Int. Cl.
*G05B 19/4062* (2006.01)

(52) U.S. Cl.
CPC ..................... *G05B 19/4062* (2013.01); *G05B 2219/41362* (2013.01)

(58) Field of Classification Search
CPC .................. G05B 19/4062; G05B 2219/41362
(Continued)

(56) References Cited

U.S. PATENT DOCUMENTS

2020/0300925 A1* 9/2020 Kobayashi ............. G01R 31/58
2020/0382027 A1* 12/2020 Shirakawa ........... H02P 29/024

FOREIGN PATENT DOCUMENTS

CN 111722585 A 9/2020
EP 3 076 540 A2 10/2016
(Continued)

OTHER PUBLICATIONS

International Search Report issued in PCT/JP2021/014818; mailed Jul. 6, 2021.

*Primary Examiner* — Kawing Chan
(74) *Attorney, Agent, or Firm* — Studebaker Brackett PLLC

(57) ABSTRACT

A wiring error detection device having a control amplifier selection unit that, in order to control a motor using some of a plurality of amplifiers, determines two or more selection patterns by selecting and combining amplifiers for the control; a command generation unit that generates, for each selection pattern determined by the control amplifier selection unit, a command for causing the motor to perform a predetermined operation; a servo control unit that calculates torque command values for controlling the motor, on the basis of the selection patterns and a command from the command generation unit; and a wiring error checking unit that compares the torque command values or the current feedback values of the motor that correspond to the two or more selection patterns with each other to determine the presence or absence of a wiring error in the system formed by the amplifiers and the motor.

8 Claims, 3 Drawing Sheets

(58) Field of Classification Search
USPC ......................................................... 318/638
See application file for complete search history.

(56)                    References Cited

FOREIGN PATENT DOCUMENTS

| JP | H10-124131 A | 5/1998 |
|----|--------------|--------|
| JP | 2000-181521 A | 6/2000 |
| JP | 2005-149067 A | 6/2005 |
| JP | 2016-018445 A | 2/2016 |
| JP | 2019-057963 A | 4/2019 |
| JP | 2020-125955 A | 8/2020 |
| JP | 2020-154772 A | 9/2020 |
| JP | 2020-195198 A | 12/2020 |
| JP | 2021-019477 A | 2/2021 |

* cited by examiner

WIRING ERROR DETECTION DEVICE FOR MOTOR

TECHNICAL FIELD

The present invention relates to a device for detecting an error in wiring of a motor.

BACKGROUND ART

In the field of machine work to which the computerized numerical control (CNC) technology is applied, a movement amount, a moving speed, and the like of a tool are numerically controlled by a computer, whereby repetition of the same machining procedure and machining on complex shapes are highly automated.

As a control system for an industrial machine such as a machine tool and a robot, there is a known system in which a servo amplifier is provided between a CNC device and a servo motor of a machine, and in response to a motion command from the CNC device, the servo amplifier drives the servo motor, thereby performing feedback control.

On the other hand, if there is a wiring error in wiring between the CNC device, the servo amplifier, and the servo motor, an unexpected motion may be performed at the start-up of the machine, which may cause an accident. As a technique for preventing such a situation, Patent Document 1 discloses a wiring error detection device for a control system including a plurality of servo motors and a plurality of servo amplifiers. If there is a wiring error between the servo motor and the servo amplifier in the control system, the wiring error detection device can automatically detect the wiring error. The wiring error detection device compares a feedback value of a current position of the servo motor with a position command value to thereby detect the wiring error.

Patent Document 1: Japanese Unexamined Patent Application, Publication No. 2020-154772

DISCLOSURE OF THE INVENTION

Problems to be Solved by the Invention

Among servo motors that require a large torque, there is a type of servo motor that is provided with a plurality of independent windings and is driven and controlled by a plurality of servo amplifiers connected to the respective windings. The technique disclosed in Patent Document 1 is disadvantageously unable to detect a wiring error of the servo motor of this type.

Here, for example, suppose that a system includes a servo motor provided with independent four windings that are connected to four servo amplifiers on a one-to-one basis, and the four servo amplifiers jointly control the servo motor based on a position command from a CNC device. In this case, even if there is a wiring error at a connection between a power line and the winding 4 among the four windings, the motor can be operated by the three normally operating amplifiers, and accordingly, the position command coincides with a position feedback value, whereby it is impossible for the technique disclosed in Patent Document 1 to detect the wiring error.

It is an object of the present invention to provide a wiring error detection device capable of detecting a wiring error of a motor that is controlled by a plurality of amplifiers.

Means for Solving the Problems

A wiring error detection device according to one embodiment of the present invention is for detecting a wiring error of a motor that is controlled by a plurality of amplifiers, and includes: a control amplifier selection unit configured to set, in order for the motor to be controlled by part of the plurality of amplifiers, two or more selection patterns by selecting and combining the amplifiers to be used to control the motor; a command generation unit configured to generate a command for causing the motor to perform a predetermined motion for each of the selection patterns set by the control amplifier selection unit; a servo control unit configured to calculate torque command values for controlling the motor, based on the selection patterns and the command from the command generation unit; and a wiring error checking unit configured to compare, between the two or more selection patterns, the torque command values corresponding to the selection patterns or electric current feedback values of the motor, to thereby determine whether there is a wiring error in wiring in paths of the amplifiers and the motor. The "wiring in paths of the amplifiers and the motor(s)" as used herein refers to, but is not limited to, a power line, a feedback cable, a power supply cable for the amplifier, etc.

A wiring error detection device according to another embodiment of the present invention is for detecting a wiring error of a plurality of motors incorporated in a machine control system in which a same motion of one control target is controlled by the plurality of motors, and includes: a control amplifier selection unit configured to set, in order for all or part of the plurality of motors to be controlled by part of a plurality of amplifiers configured to control the plurality of motors, two or more selection patterns by selecting and combining the amplifiers to be used to control the all or part of the plurality of motors; a command generation unit configured to generate a command for causing the one control target to perform a predetermined motion for each of the selection patterns set by the control amplifier selection unit; a servo control unit configured to calculate torque command values for controlling the motors, based on the selection patterns and the command from the command generation unit; and a wiring error checking unit configured to compare, between the two or more selection patterns, the torque command values corresponding to the selection patterns or electric current feedback values of the motors, to thereby determine whether there is a wiring error in wiring in paths of the amplifiers and the motors.

Effects of the Invention

The embodiment described above can detect a wiring error in wiring in paths of a motor of an industrial machine such as a machine tool and a robot and amplifiers for controlling the motor, and can prevent the machine from performing an unexpected motion that can be caused by a wiring error.

PREFERRED MODE FOR CARRYING OUT
THE INVENTION

Embodiments of the present invention will be described
with reference to the drawings.

First Embodiment

Figure 1:
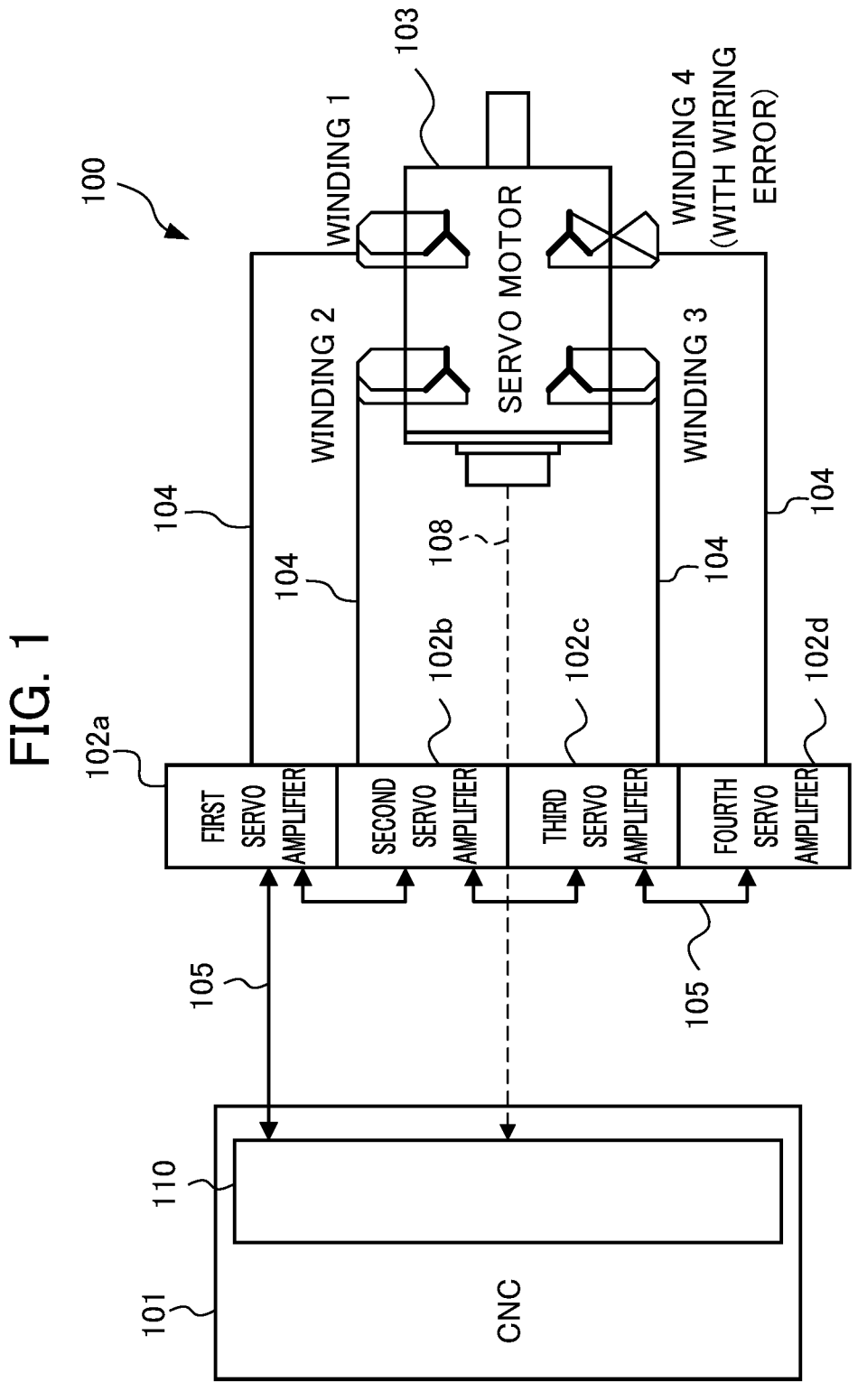
FIG. 1 is a schematic diagram illustrating a machine control system adapted for an industrial machine and including a wiring error detection device according to an embodiment of the present invention.

FIG. 1 is a schematic diagram illustrating a machine
control system 100 adapted for an industrial machine, and
including a wiring error detection device according to an
embodiment of the present invention. It should be noted that
although the present embodiment will be described based on
a case where the industrial machine is a machine tool, the
present invention is applicable to any machine having a
motor the driving of which is automatically controlled by an
amplifier, such as an industrial robot.

As illustrated in FIG. 1, the machine control system 100
includes a servo motor 103 of a machine tool such as an NC
lathe or a machining center, servo amplifiers 102 (102*a*,
102*b*, 102*c*, and 102*d*) that drive and control the servo motor
103, and a computerized numerical control (CNC) device
101 that is a host device for the servo amplifiers 102 and
controls the overall machine control system 100. The CNC
device 101 includes a wiring error detection device 110. In
the present embodiment, the wiring error detection device
110 is incorporated in the CNC device 101, but it may be
provided separately from the CNC device 101.

In the machine control system 100, the servo motor 103
is provided with four independent windings. The machine
control system 100 includes the four servo amplifiers 102,
which are denoted as "first servo amplifier 102*a*", "second
servo amplifier 102*b*", "third servo amplifier 102*c*", and
"fourth servo amplifier 102*d*", respectively. However, when
it is not necessary to distinguish one servo amplifier from the
others, or when all the four servo amplifiers are collectively
referred to, the servo amplifier(s) may be referred to as the
"servo amplifier(s) 102".

The four servo amplifiers 102 are connected to the wind-
ings of the servo motor 103 by power lines 104 on a
one-to-one basis. The four servo amplifiers 102 receive a
command from the wiring error detection device 110 of the
CNC device 101 through signal lines 105, and jointly control
the servo motor 103 based on the command. Specifically, in
the present embodiment, as illustrated in FIG. 1, a command
from the wiring error detection device 110 is first transmitted
to the first servo amplifier 102*a* through the signal line 105,
and then sequentially transmitted to the second servo ampli-
fier 102*b*, the third servo amplifier 102*c*, and the fourth servo
amplifier 102*d* through the signal lines 105 provided
between the servo amplifiers. The four servo amplifiers 102
feed back electric current values of the respective power
lines 104 of the servo motor 103 to the wiring error detection
device 110 through the signal lines 105. The four servo
amplifiers 102 may feed back electric current feedback
values via a feedback line that is provided separately. The
servo motor 103 feeds back the current position of the servo
motor 103 to the wiring error detection device 110 through
a feedback line 108.

In the following, it will be described how the wiring error
detection device 110 of the present embodiment detects a
wiring error, based on an example in which the wiring error
is caused at the connection between the winding 4 among the
four windings of the servo motor 103 and the fourth servo
amplifier 102*d*.

Figure 2:
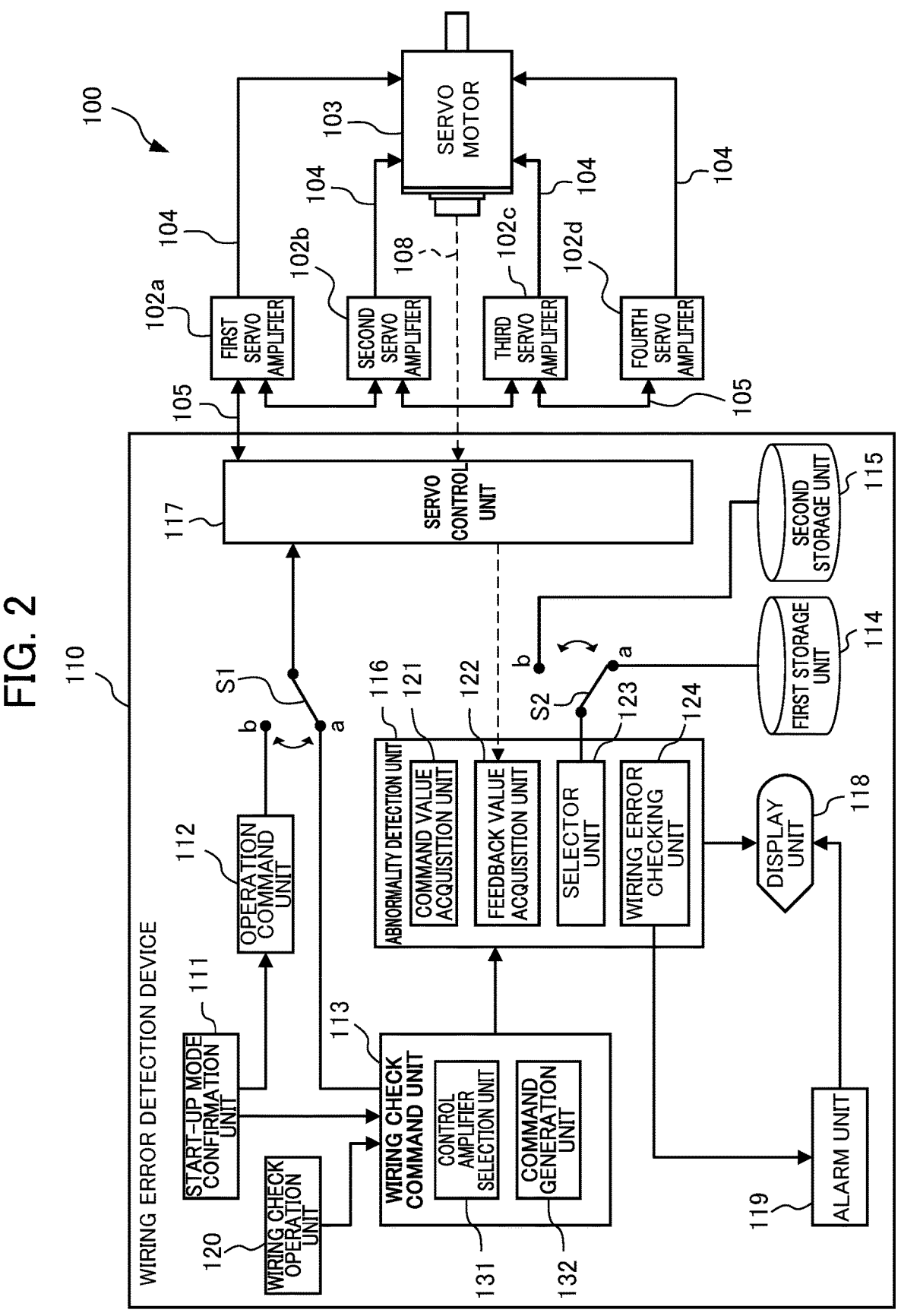
FIG. 2 is a schematic diagram illustrating a configuration of the wiring error detection device in the machine control system of FIG. 1.

FIG. 2 is a schematic diagram illustrating a configuration
of the wiring error detection device 110 in the machine control system 100 of FIG. 1. The wiring error detection
device 110 is configured to detect a wiring error in wiring in
paths of the servo amplifiers 102 and the servo motor 103.
The wiring error detection device 110 includes a start-up
mode confirmation unit 111, an operation command unit
112, a wiring check command unit 113, a first storage unit
114, a second storage unit 115, an abnormality detection unit
116, a servo control unit 117, a display unit 118, an alarm
unit 119, and a wiring check operation unit 120.

The start-up mode confirmation unit 111 detects a start-up
operation of the machine and checks whether a normal
operation mode or a start-up mode is in operation. For
example, the start-up mode confirmation unit 111 specifies
whether the normal operation mode or the start-up mode is
in operation based on the content of an input by an operator,
etc. In a case where the assembly of the machine control
system 100 has been completed and the connections of the
necessary wiring has been done, the start-up mode confir-
mation unit 111 may determine that the start-up mode is in
operation upon a signal indicating the first supply of driving
power to the machine control system 100.

When the start-up mode confirmation unit 111 confirms
that the start-up mode is in operation, switches S1 and S2 are
automatically connected to a-contacts, whereby the wiring
error detection device 110 becomes ready to detect a wiring
error. When the start-up mode confirmation unit 111 con-
firms that the normal operation mode is in operation, the
switches S1 and S2 are automatically switched to b-contacts,
whereby the machine control system 100 is ready to perform
a normal operation.

The operation command unit 112 outputs an operation
command to the servo motor 103 via the servo control unit
117 and the servo amplifiers 102 when the start-up mode
confirmation unit 111 confirms that the normal operation
mode is in operation. In a case where the abnormality
detection unit 116, which will be detailed later, has not
detected a wiring error, the operation command unit 112
receives a corresponding detection result from the abnor-
mality detection unit 116 and outputs an operation command
to the servo motor 103 in accordance with a command value
from the CNC device 101.

The wiring check command unit 113 includes a control
amplifier selection unit 131 and a command generation unit
132. In response to the wiring check command unit 113
receiving, from the start-up mode confirmation unit 111, a
confirmation signal indicating that the start-up mode is in
operation, the control amplifier selection unit 131 sets, in
order for the servo motor 103 to be controlled by part of the
plurality of servo amplifiers 102, two or more selection
patterns by selecting and combining the servo amplifiers 102
to be used to control the servo motor 103. The control
amplifier selection unit 131 sets the selection patterns based
on the number of servo amplifiers 102 connected to the servo
motor 103.

For example, as shown in Table 1, the control amplifier
selection unit 131 determines four selection patterns. Among
the four selection patterns, the selection pattern 1 is for
controlling and driving the servo motor 103 without using
the first servo amplifier 102*a*, but using the remaining three
servo amplifiers. The selection pattern 2 is for controlling
and driving the servo motor 103 without using the second
servo amplifier 102*b*, but using the remaining three servo
amplifiers. The selection pattern 3 is for controlling and
driving the servo motor 103 without using the third servo
amplifier 102*c*, but using the remaining three servo ampli-
fiers. The selection pattern 4 is for controlling and driving the servo motor 103 without using the fourth servo amplifier 102*d*, but using the remaining three servo amplifiers.

TABLE 1

|  | FIRST SERVO AMPLIFIER | SECOND SERVO AMPLIFIER | THIRD SERVO AMPLIFIER | FOURTH SERVO AMPLIFIER |
|---|---|---|---|---|
| SELECTION PATTERN 1 | NOT USED | USED | USED | USED |
| SELECTION PATTERN 2 | USED | NOT USED | USED | USED |
| SELECTION PATTERN 3 | USED | USED | NOT USED | USED |
| SELECTION PATTERN 4 | USED | USED | USED | NOT USED |

The command generation unit 132 generates a command for causing the servo motor 103 to perform a predetermined motion for each of the selection patterns set by the control amplifier selection unit 131, and outputs the generated command to the servo control unit 117 and the abnormality detection unit 116 as a command for checking wiring. The command generated by the command generation unit 132 may be a position command, a speed command, or a torque command. The present embodiment will be described based on an example in which the position command is generated. For example, the command generation unit 132 may generate one and the same position command as a command for causing the servo motor 103 to perform the same motion in all the selection patterns.

The servo control unit 117 calculates torque command values for controlling the servo motor 103 based on the selection patterns, the position command from the command generation unit 132, and the feedback value of the current position of the servo motor 103, outputs the torque command values to the servo amplifiers 102 through the signal lines 105, and feeds back the torque command values to the abnormality detection unit 116. The servo amplifiers 102 drive and control the servo motor 103 through the power lines 104, based on the commands from the servo control unit 117.

The servo control unit 117 may acquire electric current values of the power lines 104 of the servo motor 103 from the servo amplifiers 102 through the signal lines 105, and may set the acquired values as electric current feedback values. In this case, the servo control unit 117 feeds back the acquired electric current feedback values to the abnormality detection unit 116.

The abnormality detection unit 116 is configured to determine whether there is a wiring error in the paths of the servo amplifiers 102 and the servo motor 103, and to identify the wiring error. The abnormality detection unit 116 includes a command value acquisition unit 121, a feedback value acquisition unit 122, a selector unit 123, and a wiring error checking unit 124.

The command value acquisition unit 121 receives from the wiring check command unit 113 a command for checking wiring, and acquires information regarding the selection patterns. The command value acquisition unit 121 may further acquire various command values (e.g., a rotational speed command value for the servo motor 103) from the CNC device 101.

The feedback value acquisition unit 122 acquires torque command values for controlling the servo motor 103 from the servo control unit 117. The feedback value acquisition unit 122 can also acquire electric current feedback values from the servo control unit 117.

Here, the feedback value acquisition unit 122 includes, for example, a timer, and is configured to acquire a feedback value of a certain time when the operation has been stabilized, at a clock time subsequent to the lapse of a preset dead time from the start of driving of the servo motor 103 (clock time after the lapse of a certain time period). The feedback value acquisition unit 122 may be configured to acquire feedback values at a plurality of clock times in an arbitrary time period after the elapse of a preset dead time from the start of driving of the servo motor 103 (at a plurality of clock times in an arbitrary time period after the elapse of a predetermined time period).

The wiring error checking unit 124 compares, between the four selection patterns, the torque command values corresponding to the selection patterns and acquired by the feedback value acquisition unit 122 or the electric current feedback values corresponding to the selection patterns and acquired by the feedback value acquisition unit 122, and thereby determines whether there is a wiring error in wiring in the paths of the servo amplifiers 102 and the servo motor 103.

For example, suppose that in order to cause the servo motor 103 to perform the same motion in the four selection patterns shown in Table 1, the command generation unit 132 generates one and the same position command and outputs it to the servo control unit 117. In each of the selection patterns 1 to 3, the three servo amplifiers that are used to drive the servo motor 103 include the fourth servo amplifier 102*d* having a wiring error. Since the fourth servo amplifier 102*d* having the wiring error does not contribute to the motion of the servo motor 103 required by the command from the command generation unit 132, only the remaining two servo amplifiers contribute to the motion of the servo motor 103 required by the command from the command generation unit 132. As a result, a torque command value that the servo control unit 117 calculates in order for the remaining two servo amplifiers to drive the servo motor 103 is larger than in a case where three servo amplifiers drive the servo motor 103. Since the selection patterns 1 to 3 bring about substantially the same situation, the torque command values corresponding to these selection patterns are the same as or approximate to each other.

On the other hand, in the selection pattern 4, the three servo amplifiers that are used to drive the servo motor 103 do not include the fourth servo amplifier 102*d* having the wiring error. Therefore, all the three servo amplifiers can contribute to the motion of the servo motor 103 required by the command from the command generation unit 132. As a result, a torque command value that the servo control unit 117 calculates in order to drive the servo motor 103 is smaller than in the case where two servo amplifiers drive the servo motor 103.

The wiring error checking unit 124 compares the torque command values corresponding to the four selection patterns. The selection patterns 1 to 3 have the same or approximate torque command values, whereas the selection pattern 4 has a smaller torque command value significantly different from the torque command values of the selection patterns 1 to 3. If there is an abnormality in the differences between the torque command values, the wiring error checking unit 124 determines that a wiring error has occurred in the path of the fourth servo amplifier 102*d* and the servo motor 103.

In a case where there is no wiring error, the torque command values corresponding to the four selection patterns are all the same as or approximate to one another, so that there will be almost no difference between the torque command values.

When the abnormality detection unit 116 determines that a wiring error has occurred, the alarm unit 119 outputs an alarm based on the result of the determination, and the display unit 118 displays the occurrence of the wiring error, whereby the operator or the like is notified of the wiring error. As the alarm, a warning sound may be issued or a warning lamp may be turned on. Control is performed to prevent the servo motor 103 from performing an unexpected hazardous motion/abnormal motion due to the wiring error. For example, control is performed to prevent transition to the normal operation mode.

In a case where the abnormality detection unit 116 determines that no wiring error has occurred, the display unit 118 displays that the wiring is in a normal state, whereby the operator or the like is notified of the normal state.

In response to the abnormality detection unit 116 determining that no wiring error has occurred, the switches S1 and S2 are automatically switched to the b-contacts, and the start-up mode ends. In this case, the operation command unit 112 outputs a command for causing the servo control unit 117 to perform a normal operation according to a command value from the CNC device 101.

The abnormality detection unit 116 can not only determine the presence or absence of a wiring error as described above, but also detect an abnormality in the servo motor 103 by comparing a position deviation of the servo motor 103 with an alarm detection threshold value. Here, the "position deviation" refers to a difference between a position command value and a feedback value of a current position of the servo motor 103.

The first storage unit 114 and the second storage unit 115 each store an alarm detection threshold value for preventing the servo motor 103 from performing an unexpected hazardous motion. The first storage unit 114 stores an alarm detection threshold for the start-up mode, and the second storage unit 115 stores an alarm detection threshold for the normal operation mode. For example, a position deviation limit value at the time of driving may be set to 10 as the alarm detection threshold value for the start-up mode, and a position deviation limit value at the time of driving may be set to 160000 as the alarm detection threshold value for the normal operation mode.

The selector unit 123 of the abnormality detection unit 116 selectively acquires the alarm detection threshold for the start-up mode from the first storage unit 114, and the alarm detection threshold for the normal operation from the second storage unit 115. For example, when the start-up mode confirmation unit 111 determines that the start-up mode is in operation, the switch S2 is automatically connected to the a-contact, and consequently, the selector unit 123 acquires the alarm detection threshold value for the start-up mode from the first storage unit 114. When the start-up mode confirmation unit 111 determines that the normal operation mode is in operation, the switch S2 is automatically switched to the b-contact, and consequently, the selector unit 123 acquires the alarm detection threshold value for the normal operation from the second storage unit 115. Due to this configuration, in the start-up mode, the alarm detection threshold value for the start-up mode is automatically adopted, without requiring the user (operator) of the machine to change the setting. Likewise, during the normal operation, the alarm threshold is automatically set to the alarm detection threshold for the normal operation.

When the abnormality detection unit 116 detects that the position deviation exceeds the alarm detection threshold value, the alarm unit 119 outputs an alarm based on the detection result, and the display unit 118 displays the contents of the alarm, whereby the operator or the like is notified of the alarm. As a result, the servo motor 103 can be prevented from performing an unexpected hazardous motion.

In a case where the abnormality detection unit 116 determines, in the start-up mode, that no wiring error has occurred, the switch S2 is automatically switched to the b-contact, and consequently, the selector unit 123 acquires the alarm detection threshold value for the normal operation from the second storage unit 115, and replaces the alarm detection threshold value for the start-up mode with the alarm detection threshold value for the normal operation.

As illustrated in FIG. 2, the wiring error detection device 110 further includes a wiring check operation unit 120. By operating the wiring check operation unit 120 regardless of whether the machine is in the start-up mode or the normal operation mode, the wiring check command unit 113 outputs a command whereby the same wiring check as described above can be performed.

Due to this configuration, for example, when only a part of the wiring work for the system is completed, or when a wiring check is needed at the time of replacement of a maintenance component, the wiring check operation unit 120 is operated to perform the wiring check.

As described above, the wiring error detection device of the present embodiment is applicable to a machine control system in which a servo motor is controlled by a plurality of servo amplifiers, and is capable of detecting a wiring error in paths of the servo amplifiers and the servo motor and identifying the servo amplifier involved in the wiring error.

Second Embodiment

Figure 3:
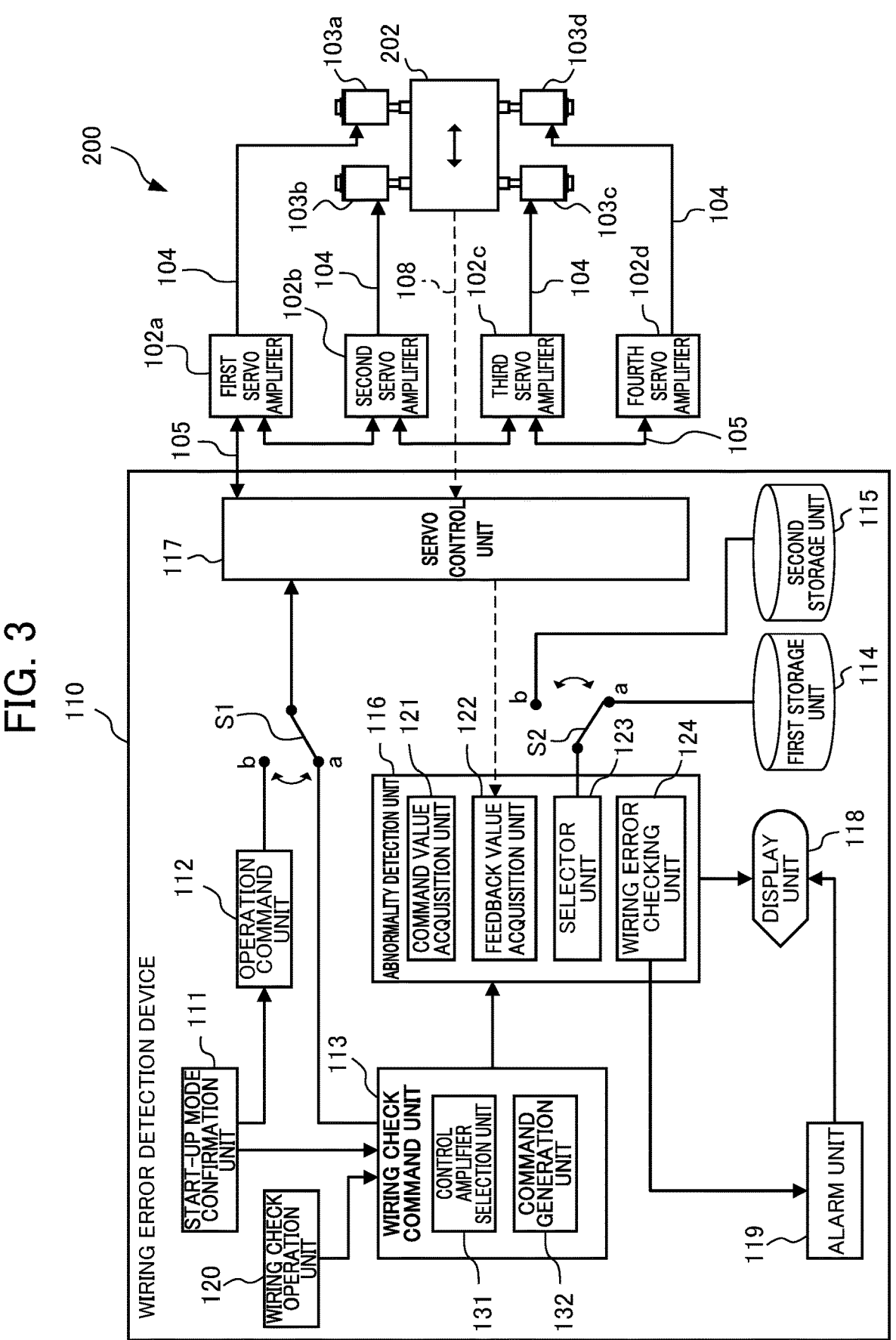
FIG. 3 is a schematic diagram illustrating another machine control system including a wiring error detection device according to an embodiment of the present invention.

FIG. 3 is a schematic diagram illustrating another machine control system 200 including a wiring error detection device according to an embodiment of the present invention. The machine control system 200 of the present embodiment is a modification of the machine control system 100 of the first embodiment. In the present embodiment, parts, members, portions, elements, and components having the same or similar functions as those of the first embodiment are denoted by the same reference signs as in the first embodiment, and description thereof may be omitted.

A largest difference between the machine control system 200 and the machine control system 100 of the first embodiment is that the same motion of one control target is controlled by a plurality of motors. Specifically, four servo motors are driven and controlled by four servo amplifiers on a one-to-one basis, and jointly drive one table 202 to move the table 202 in the left direction or the right direction in FIG. 3. A large torque can be obtained by driving the four servo motors.

The four servo motors are denoted as "first servo motor 103a", "second servo motor 103b", "third servo motor 103c", and "fourth servo motor 103d", respectively. However, when it is not necessary to distinguish one servo motor from the others, or when all the four servo motors are collectively referred to, the servo motor(s) may be referred to as the "servo motor(s) 103". In the example shown in FIG. 3, each of the four servo motors is driven by one servo amplifier. However, all or part of the four servo motors may each be driven by a plurality of servo amplifiers. For example, the first servo motor 103a and the fourth servo motor 103*d* may each be driven by a plurality of servo amplifiers, and the second servo motor 103*b* and the third servo motor 103*c* may each be driven by one servo amplifier.

The machine control system 200 includes a wiring error detection device 110 that has the same configuration as the wiring error detection device of the machine control system 100. However, some portions perform different functions and handle different signals, which will be described in the following.

A control amplifier selection unit 131 sets two or more selection patterns by selecting and combining the servo amplifiers 102 to be used to control the servo motors 103 in order for a wiring error to be detected while the table 202 is driven by all the four servo motors 103 (in a case where among the four servo motors, one or more servo motors are controlled by two or more of the servo amplifiers) or by part of the four servo motors 103 in such a manner that all or part of the four servo motors 103 are controlled by part of the plurality of servo amplifiers for controlling the four servo motors. For example, also in the present embodiment, four selection patterns can be determined as shown in Table 1. The control amplifier selection unit 131 sets the selection patterns based on the number of the servo amplifiers 102 or the number of the servo motors 103.

A command generation unit 132 generates a command for causing the table 202 to perform a predetermined motion for each of the selection patterns set by the control amplifier selection unit 131, and outputs the command to a servo control unit 117 and an abnormality detection unit 116 as a command for checking wiring. The command generated by the command generation unit 132 may be a position command, a speed command, or a torque command. The present embodiment will be described based on an example in which the position command for the table 202 is generated. For example, the command generation unit 132 may generate one and the same position command as a command for causing the table 202 to perform the same motion in all the selection patterns.

On the other hand, the table 202 feeds back a current position of the table 202 to the servo control unit 117 through a feedback line 108.

The servo control unit 117 calculates torque command values for controlling the servo motors 103 based on the selection patterns, the position command from the command generation unit 132, and the feedback value of the current position of the table 202, outputs the torque command values to the servo amplifiers 102 through signal lines 105, and feeds back the torque command values to the abnormality detection unit 116. The servo amplifiers 102 drive and control the servo motors 103 through power lines 104 based on the commands from the servo control unit 117.

The servo control unit 117 may acquire electric current values of the power lines 104 of the servo motors 103 from the servo amplifiers 102 through the signal lines 105, and may set the acquired values as electric current feedback values. In this case, the servo control unit 117 feeds back the acquired electric current feedback values to the abnormality detection unit 116.

A wiring error checking unit 124 compares, between the four selection patterns, the torque command values corresponding to the selection patterns and acquired by a feedback value acquisition unit 122 or the electric current feedback values corresponding to the selection patterns and acquired by the feedback value acquisition unit 122, and thereby determines whether there is a wiring error in wiring in paths of the servo amplifiers 102 and the servo motors 103.

For example, an assumption is made that there is a wiring error at the connection between the fourth servo amplifier 102*d* and the fourth servo motor 103*d*. Here, suppose that in order to cause the table 202 to perform the same motion in the four selection patterns shown in Table 1, the command generation unit 132 generates one and the same position command and outputs it to the servo control unit 117. In each of the selection patterns 1 to 3, the three servo amplifiers that are used to drive the table 202 include the fourth servo amplifier 102*d* having the wiring error. Since the fourth servo amplifier 102*d* and the fourth servo motor 103*d*, between which the wiring error exists, do not contribute to the motion of the table 202 required by the command from the command generation unit 132, only the remaining two servo amplifiers and the corresponding two servo motors contribute to the motion of the table 202 required by the command from the command generation unit 132.

As a result, a torque command value that the servo control unit 117 calculates in order for the remaining two servo motors to drive the table 202 is larger than in a case where three servo motors drive the table 202. Since the selection patterns 1 to 3 bring about substantially the same situation, the torque command values corresponding to these selection patterns are the same as or approximate to each other.

On the other hand, in the selection pattern 4, the three servo amplifiers that are used to drive the table 202 do not include the fourth servo amplifier 102*d* having the wiring error. Therefore, all the three servo amplifiers and all the corresponding three servo motors can contribute to the motion of the table 202 required by the command from the command generation unit 132. As a result, a torque command value that the servo control unit 117 calculates in order to drive the table 202 is smaller than in the case where two servo motors drive the table 202.

The wiring error checking unit 124 compares the torque command values corresponding to the four selection patterns. The selection patterns 1 to 3 have the same or approximate torque command values, whereas the selection pattern 4 has a smaller torque command value significantly different from the command values of the selection patterns 1 to 3. If there is an abnormality in the differences between the torque command values, the wiring error checking unit 124 determines that a wiring error has occurred in the path of the fourth servo amplifier 102*d* and the fourth servo motor 103*d*.

As described above, the wiring error detection device of the present embodiment is applicable to a machine control system in which one control target is controlled by a plurality of servo motors controlled by a plurality of servo amplifiers, and is capable of detecting a wiring error in wiring in paths of the servo amplifiers and the servo motors and identifying the servo amplifier involved in the wiring error.

While the present invention has been described with reference to the embodiments, the technical scope of the present invention is not limited to the above embodiments. It is apparent to those skilled in the art that various changes or improvements can be added to the above embodiments. It is also apparent from the claims that the embodiments with such changes or improvements added thereto can be included in the technical scope of the present invention. For example, the above embodiments have been described in detail in order to facilitate understanding of the present invention, but the present invention is not necessarily limited to a combination of all the features described above. It should be noted that part of the configurations of the respective embodiments can be replaced with other configurations or can be excluded.

EXPLANATION OF REFERENCE NUMERALS

100: Machine control system
101: CNC device
102: Servo amplifier
102a: First servo amplifier
102b: Second servo amplifier
102c: Third servo amplifier
102d: Fourth servo amplifier
103: Servo motor
103a: First servo motor
103b: Second servo motor
103c: Third servo motor
103d: Fourth servo motor
104: Power line
105: Signal line
108: Feedback line
110: Wiring error detection device
111: Start-up mode confirmation unit
112: Operation command unit
113: Wiring check command unit
114: First storage unit
115: Second storage unit
116: Abnormality detection unit
117: Servo control unit
118: Display unit
119: Alarm unit
120: Wiring check operation unit
121: Command value acquisition unit
122: Feedback value acquisition unit
123 Selector unit
124: Wiring error checking unit
131: Control amplifier selection unit
132: Command generation unit
200: Machine control system
202: Table
S1, S2: Switch

The invention claimed is:

1. A wiring error detection device for detecting a wiring error of a motor that is controlled by a plurality of amplifiers, the wiring error detection device comprising:
a control amplifier selection unit configured to set, in order for the motor to be controlled by part of the plurality of amplifiers, two or more selection patterns by selecting and combining the amplifiers to be used to control the motor;
a command generation unit configured to generate a command for causing the motor to perform a predetermined motion for each of the selection patterns set by the control amplifier selection unit;
a servo control unit configured to calculate torque command values for controlling the motor, based on the selection patterns and the command from the command generation unit; and
a wiring error checking unit configured to compare, between the two or more selection patterns, the torque command values corresponding to the selection patterns or electric current feedback values of the motor, to thereby determine whether there is a wiring error in wiring in paths of the amplifiers and the motor.

2. The wiring error detection device according to claim 1, wherein
the command generation unit generates, as the command, a same position command, a same speed command, or a same torque command in order to cause the motor to perform a same motion in all the selection patterns.

3. The wiring error detection device according to claim 1, wherein
the control amplifier selection unit sets the selection patterns based on a number of the amplifiers connected to the motor.

4. The wiring error detection device according to claim 1, further comprising:
a start-up mode confirmation unit configured to confirm whether a normal operation mode or a start-up mode is in operation, wherein
the wiring error detection device detects a wiring error in a case where the start-up mode is in operation.

5. A wiring error detection device for detecting a wiring error of a plurality of motors incorporated in a machine control system in which a same motion of one control target is controlled by the plurality of motors, the wiring error detection device comprising:
a control amplifier selection unit configured to set, in order for all or part of the plurality of motors to be controlled by part of a plurality of amplifiers configured to control the plurality of motors, two or more selection patterns by selecting and combining the amplifiers to be used to control the all or part of the plurality of motors;
a command generation unit configured to generate a command for causing the one control target to perform a predetermined motion for each of the selection patterns set by the control amplifier selection unit;
a servo control unit configured to calculate torque command values for controlling the motors, based on the selection patterns and the command from the command generation unit; and
a wiring error checking unit configured to compare, between the two or more selection patterns, the torque command values corresponding to the selection patterns or electric current feedback values of the motors, to thereby determine whether there is a wiring error in wiring in paths of the amplifiers and the motors.

6. The wiring error detection device according to claim 5, wherein
the command generation unit generates, as the command, a same position command, a same speed command, or a same torque command in order to cause the one control target to perform a same motion in all the selection patterns.

7. The wiring error detection device according to claim 5, wherein
the control amplifier selection unit sets the selection patterns based on a number of the amplifiers or a number of the motors.

8. The wiring error detection device according to claim 5, further comprising:
a start-up mode confirmation unit that confirms whether a normal operation mode or a start-up mode is in operation, wherein
the wiring error detection device detects a wiring error in a case where the start-up mode is in operation.

* * * * *